United States Patent Office 3,325,389
Patented June 13, 1967

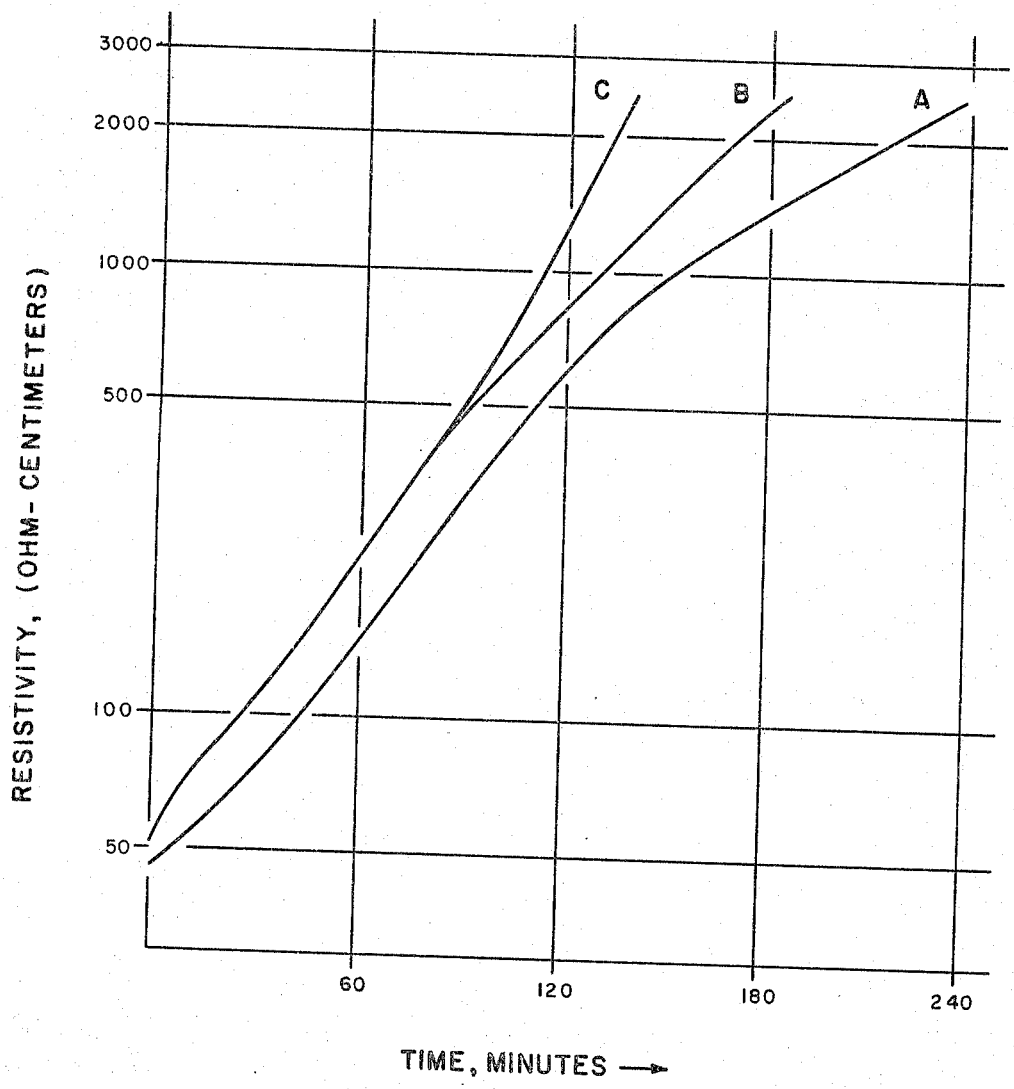

3,325,389
PROCESS FOR PRETREATMENT OF WHEY TO
INCREASE DEMINERALIZATION RATE
Edgardo J. Parsi, Wellesley Hills, Thomas A. Kirkham, Lexington, and Albert Szczur, Jr., New Bedford, Mass., assignors to Ionics, Incorporated, Cambridge, Mass., a corporation of Massachusetts
Filed Feb. 28, 1963, Ser. No. 261,751
2 Claims. (Cl. 204—180)

This invention relates to the demineralization of aqueous organic solutions by electrodialysis, as for example cane sugar juice, citrus fruit juice, molasses, glycerine, cottage and Cheddar cheese whey and the like. In particular it relates to an improved process of deionizing organic solutions and more particularly to a pre-treatment method prior to the demineralization process or at least during some stage of the process. More particularly, it is concerned with the combination of pretreatment of a whey solution followed by electrodialysis of the treated whey.

The full scale commercial use of electrodialysis for deionizing organic solutions, especially in the case of whey solutions, has in recent times been successfully accomplished. In the process of deionizing solutions a membrane demineralizer is utilized having a set of desalting or deionizing chambers (for the product stream) alternately disposed between a set of salt concentrating chambers (for the waste stream) and, in addition, at least two terminal electrode chambers in which the current enters and leaves the demineralizer. The aforementioned chambers are separated by barriers of electrolytically-conductive, hydraulically-impermeable, ion-permselective alternating cation and anion selective membranes, through which the dissolved electrolytes of a liquid are transferred from the desalting chambers to the concentrating chambers by means of a direct electric current in series across the membranes and the chambers defined between them. In this manner the dissolved salts are concentrated in the concentrating or waste chambers and continuously carried away through discharge outlets. The combination of a desalting and concentrating chamber constitutes a cell pair. Any number of cell pairs can be stacked between a pair of electrodes to produce a demineralization stack containing 150 cell pairs or more. Such systems are more fully described in U.S. Patents 2,694,680, 2,752,306, 2,848,403, 2,891,899 and 3,003,940. The manufacture and properties of ion-selective membranes of the type employed in electrodialysis systems are fully discussed in U.S. Patents Re. 24,865, 2,730,768, 2,702,272, 2,731,411 and many others.

In the electrodialysis of aqueous organic solutions, especially protein containing liquids, it has been found that the initial deionizing rate proceeds rapidly but that the rate of removal of the last portions of the dissolved salts slow down considerably. For example, where one attempts to desalt a volume of whey, the rate of salt removal is rapid up to about a 50–60% salt removal level but beyond this point the rate of demineralization slows down or tails off. This "tail" which occurs at the latter portion of a demineralization run is a slow-down in the rate of desalting and severely limits the capacity of a demineralization plant. It may take ⅓ the time to reach a 50–60% salt removal level but ⅔ the time to finally reach the 95% level or better. While the exact causes of this slow-down or "tail" are not definitely known, it is postulated that residual ions are complexed or occluded with colloidal protein material. The ions, such as $K^+$ and $Cl^-$, that are not tied up with the proteins are fully ionizable and removed rapidly during the initial demineralization but other ions such as $Ca^{++}$ and $SO_4^=$ are tied up with the organic colloids and are not as free to move and therefore more difficult to transfer. This produces the slow-down or "tail" portion of a demineralization run. The organic colloids or materials that contribute toward a slow-down in the demineralization rate will hereinafter be designated, for want of a better word, as "demineralization inhibitors."

It is therefore the object of the present invention to provide a method to increase the rate of demineralization of aqueous organic liquids. Another object is to treat the organic liquid at some stage prior to the desired demineralization to prevent or decrease the "tail" portion of the deionization operation. A further object is to render those ions which are difficult to transfer more transferable by removing or neutralizing the "demineralization inhibitors" using a simple and economical process. A still further object is to deionize a whey solution to greater than 50% by electrodialysis at a faster rate than has heretofore been possible and therefore substantially increasing the capacity of electrodialysis stacks.

Various objects and advantages will appear from the following description of several embodiments of the invention, and the novel features will be particularly pointed out hereinafter in connection with the appended claims.

In the known process of deionizing an organic liquid, as for example a Cheddar cheese whey solution, by electrodialysis, the raw whey containing about 6% total solids, is flowed into multi-effect evaporators where it is concentrated to about 25% total solids. This reduces the volume of fluid which is to be treated and circulated through the electrodialysis units. The increase of the dissolved salt concentration to about 6,000 p.p.m. makes for a more economical salt removal. The whey solution is then passed through desalting chambers of multi-electrodialysis stacks. The whey may flow in series from one stack to another or, in the alternative, may be continuously recirculated through a stack in batch process operation. The salts of the whey solution are transferred to the concentrating chambers through the permselective membranes. An acidified brine solution is circulated through the concentrating chambers, and the salt entering these chambers is continuously carried away through discharge outlets. The whey solution is continuously recirculated through a stack or series of stacks until its salt content has been reduced to at least 90–95%. The length of the demineralization cycle varies from four to seven hours depending on operating conditions. The power required for the demineralization will vary depending on the flow rate, the salt concentration, and the like. The demineralized whey product is then further concentrated in single effect evaporators to 45% maximum solid, and then dried to 95–98% total solids in a centrifuge atomizing spray dryer. The demineralized whey is a fluffy-cream-colored product which is of great importance in the formulation of baby food closely resembling human milk in composition.

We have now discovered that aqueous organic solutions may be more effectively and rapidly demineralized by electrodialysis by first treating the organic solution to remove those "demineralization inhibitors" in the solution that tie up or complex residual ions to cause a slowing down of the rate of demineralization. This slowing down is especially pronounced where the demineralization is carried beyond the 50–60% stage. It has unexpectedly been found that the ions remaining in the solution after removal of the "inhibitors" are more rapidly and steadily transferred therefrom. Broadly speaking the treatment of the organic solution involves coagulating, agglomerating, or neutralizing the "inhibiting substance" by a combination of heating, pH adjustment, and removal of "inhibitors" from the solution by mechanical means such as filtration, centrifugation, or the like. An effective alternate method of removing the "inhibitors" can be accomplished by absorption on an absorbing agent such as a bed of activated charcoal prior to the desired degree of demineralization of the organic solution. It is also contemplated that the treatment step can be done on the organic solution after the solution has been partially demineralized and before the "tail" portion of the demineralization cycle is encountered.

The new process of this invention involves heating the aqueous organic solution, for example whey, for a length of time not exceeding 30 hours, and preferably not exceeding 2 hours. The temperature employed should not exceed 160° F. and is preferably between 130° and 145° F. During the heating process the pH of the whey should be maintained on the acid side, but in no case should there be an acidity greater than 3.0. The most preferable acidity range, however, is a pH between about 4 and 5. After the heating and acid treatment, the solution is filtered to remove the undesired inhibitors. Prior to deionization by electrodialysis the solution, if desired, may be readjusted to its original pH of 6–6.5 by addition of a base.

The drawing represents a semi-log graph representing three demineralization runs on a 24% total solid Cheddar cheese whey solution having an initial concentration of dissolved salts of about 6000 p.p.m. The graph shows the relationship between resistivity in ohm-cm. of the whey solution and the time required to obtain a 95% reduction in the salt concentration. The curves summarize the effects obtained as follows:

Curve A represents the demineralization curve of untreated whey solution wherein the "demineralization inhibitors" were not removed by the process of this invention.

Curve B represents the curve in which the whey solution was pretreated prior to demineralization by absorption of some of the inhibitory substances on activated charcoal.

Curve C represents a curve in which the whey solution was pretreated to remove inhibitors by a combination process of heating, acidification and filtration.

It is clearly seen from an examination of the graph that the pretreatment of whey solution by the methods of this invention substantially reduces the time required for demineralization. It will be noted that untreated whey (Curve A) required 240 minutes to reach a resistivity of 2500 ohm-cm. (approximately 300 p.p.m. of dissolved salts) whereas in Curves B and C the time required was 185 and 140 minutes, respectively. The greatest improvement is represented by Curve C where demineralization proceeded at a substantially steady rate so that no apparent "tail" occurred. This resulted in the demineralization time being reduced by 42%. It may be observed by inspection of the graph that the three curves run relatively linear to each other during the initial demineralization and that at about the 500 ohm-centimeter point a "tail" or slow-down in the demineralization rate begins to develop. No "tail" is noticeable in Curve C since the line appears substantially linear. In Curves A and B the lines curve off asymptotically at the 500 ohm-centimeter point to define the "tail" portion of the demineralization runs. The "tail" is most pronounced in Curve A which represents the operation on untreated whey solution.

The following examples further illustrate the invention.

*Example 1*

A Cheddar cheese whey solution having a 24% total solid content was subjected to heating for one hour at 140° F. Prior to the heating process acid, such as HCl, was added to the whey to lower the pH from 6.2 to between 4 and 5.

During the heating, gentle stirring of the whey solution was employed. After heating, the whey was allowed to cool and the fluid mass was then filtered to remove the "demineralization inhibitors." The pH was then adjusted to between 6 and 6.2 by addition of a base. 1200 milliliters of the filtered whey solution was then subjected to electrodialysis in a batch-type demineralization run. The results obtained are shown as Curve C in the drawing. The unit employed for the demineralization comprised 5 cell pairs and the whey solution was recirculated through the unit at a velocity of 50 cm./sec. At the start of the batch demineralization run an initial current density of 30 milliamps per square centimeter of membrane area was employed. During the entire course of the demineralization, the current density to the cell was gradually decreased. When 95% salt removal had been attained, the current density had fallen to about 3 milliamps per square centimeter.

An alternate method of pretreating the whey would be to adjust the pH to between 4 and 5 during the evaporation process where the raw whey, containing 6% total solids, is evaporated to a concentration of 24% total solids.

A 24% total solids whey solution was demineralized as in the above example with no prior treatment of the whey. The result of this demineralization run is shown in Curve A of the drawing.

*Example 2*

A 24% total solid Cheddar cheese solution at ambient temperature was passed through a 6–14 mesh activated cocoanut charcoal. No adjustment of the pH was employed here. The charcoal treated whey was then deionized using the same electrodialysis unit and operating conditions employed in Example 1. The result of the demineralization run is shown in Curve B of the drawing wherein it is readily apparent that this method of pretreating the whey has also decreased the demineralization time required in the case of non-treated whey.

*Example 3*

Blackstrap molasses (30° Brix) containing 27% total solids was heated for 2 hours at 130° to 140° F. Sulfuric acid was added to the molasses to maintain the pH between 3 and 4 during the heating period. On cooling, the molasses was filtered under pressure through a fine dynel cloth filter to remove the "demineralization inhibitors." 1200 milliliters of the filtrate was collected and the demineralization was carried out in a batch-wise process at 140° F. until the molasses had been 85% demineralized. A current density range of 15 to 5 milliamps per square centimeter of membrane area was employed during the course of the demineralization. The results showed a 30% reduction in the time required to demineralize molasses by 85% over that of untreated molasses.

*Example 4*

The untreated blackstrap molasses used in Example 3 was passed through activated charcoal, acidified to a pH of about 3.5 and then demineralized to 85% salt removal using the same operating electrodialysis conditions employed in Example 3. The results were similar to Example 3 in that the demineralization time was also reduced by about 30% over untreated molasses.

It will be understood that various changes in the details, materials and steps which have been herein described in order to demonstrate the nature of the invention may be made by those skilled in the art within the principles and scope of the invention as expressed in the appended claims.

What we claim is:

1. The process of treating an aqueous organic solution selected from the group consisting of whey and blackstrap molasses wherein demineralization inhibitors contained therein are substantially removed to allow for an increased rate of demineralization of said solution by electrodialysis, said treatment comprising heating said solution to an elevated temperature between 130° to 145° F. for no longer than 30 hours, maintaining said solution on the acid side between a pH of about 4 to 5 during said heating period, mechanically separating said inhibitor precipitated from said solution and deionizing said solution by electrodialysis between spaced alternating cation and anion permselective ion exchange membranes.

2. The process of claim 1 wherein the aqueous organic solution is Cheddar cheese whey and wherein the mechanical separation of inhibitors is by filtration.

References Cited

UNITED STATES PATENTS

| | | | |
|---|---|---|---|
| 2,631,100 | 3/1953 | Aten | 204—180 |
| 2,695,235 | 11/1954 | deGoede | 99—57 |
| 2,758,965 | 8/1956 | Block | 204—180 |
| 3,063,924 | 11/1962 | Gomella | 204—180 |

FOREIGN PATENTS

| | | |
|---|---|---|
| 248,998 | 3/1926 | Great Britain. |
| 659,494 | 10/1951 | Great Britain. |

JOHN H. MACK, *Primary Examiner.*

HOWARD S. WILLIAMS, *Examiner.*

G. E. BATTIST, E. ZAGARELLA, *Assistant Examiners.*